(12) United States Patent
Pargeter et al.

(10) Patent No.: US 9,157,229 B2
(45) Date of Patent: Oct. 13, 2015

(54) PREFABRICATED COMPOSITE INSULATION BOARD

(75) Inventors: Adrian Pargeter, West Midlands (GB); Malcolm Rochefort, Ludlow (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 40 days.

(21) Appl. No.: 13/704,085

(22) PCT Filed: Jun. 27, 2011

(86) PCT No.: PCT/IE2011/000033
§ 371 (c)(1),
(2), (4) Date: Dec. 13, 2012

(87) PCT Pub. No.: WO2012/001672
PCT Pub. Date: Jan. 5, 2012

(65) Prior Publication Data
US 2013/0089696 A1    Apr. 11, 2013

(30) Foreign Application Priority Data
Jul. 2, 2010   (IE) .................................... 2010/0410

(51) Int. Cl.
| | |
|---|---|
| *E04B 1/80* | (2006.01) |
| *B32B 3/08* | (2006.01) |
| *B32B 3/10* | (2006.01) |
| *B32B 5/20* | (2006.01) |
| *B32B 7/12* | (2006.01) |
| *B32B 15/00* | (2006.01) |

(Continued)

(52) U.S. Cl.
CPC ................ *E04B 1/803* (2013.01); *B32B 3/085* (2013.01); *B32B 3/10* (2013.01); *B32B 5/20* (2013.01); *B32B 7/12* (2013.01); *B32B 15/00* (2013.01); *B32B 17/00* (2013.01); *B32B 29/00* (2013.01); *B32B 37/1207* (2013.01); *B32B 38/00* (2013.01); *B32B 2038/1891* (2013.01); *Y02B 80/12* (2013.01); *Y10T 428/231* (2015.01)

(58) Field of Classification Search
None
See application file for complete search history.

(56) References Cited

U.S. PATENT DOCUMENTS

| | | | |
|---|---|---|---|
| 5,875,599 A | 3/1999 | McGrath | |
| 6,266,941 B1 | 7/2001 | Nishimoto | |

(Continued)

FOREIGN PATENT DOCUMENTS

| | | |
|---|---|---|
| EP | 1 045 079 | 10/2000 |
| EP | 1505359 A1 * | 2/2005 |

(Continued)

OTHER PUBLICATIONS

Machine Translation of JP 2000-248653. Sep. 2000.*

*Primary Examiner* — Barbara J Musser
(74) *Attorney, Agent, or Firm* — Harness, Dickey & Pierce, P.L.C.

(57) ABSTRACT

A prefabricated composite insulation board comprises a facing of a flexible sheet material and a plurality of vacuum insulation panels (VIP) adhesive bonded thereto. A body of insulating foam overlies the vacuum insulating panels and the carrier. There are gaps between adjacent vacuum insulation panels and these gaps are filled with the foam. Alternatively, groups of VIP's may be positioned close to one another and gaps left at defined locations. These gaps may be used to provide regions at which the panel may be cut to a desired length without cutting through and VIP's. External markings such as cut-lines may be provided to indicated the location of these gaps.

12 Claims, 9 Drawing Sheets

(51) Int. Cl.
  *B32B 17/00* (2006.01)
  *B32B 29/00* (2006.01)
  *B32B 37/12* (2006.01)
  *B32B 38/00* (2006.01)
  *B32B 38/18* (2006.01)

(56) References Cited

U.S. PATENT DOCUMENTS

| | | | |
|---|---|---|---|
| 6,892,507 B1 * | 5/2005 | Pease | 52/794.1 |
| 7,414,010 B2 * | 8/2008 | Burrows | 503/227 |
| 2004/0014382 A1 * | 1/2004 | MacAulay | 442/23 |
| 2009/0114656 A1 * | 5/2009 | Dain et al. | 220/560.15 |
| 2010/0028668 A1 * | 2/2010 | Janda et al. | 428/342 |

FOREIGN PATENT DOCUMENTS

| | | |
|---|---|---|
| GB | 2 427 883 | 1/2007 |
| JP | 2000-248653 | 9/2000 |
| JP | 2005-282840 | 10/2005 |
| WO | 2004/051134 | 6/2004 |

* cited by examiner

PREFABRICATED COMPOSITE INSULATION BOARD

This is a national stage of PCT/IE11/00033 filed Jun. 27, 2011 and published in English, which has a priority of Ireland no. 2010/0410 filed Jul. 2, 2010, hereby incorporated by reference.

This invention relates to vacuum insulation panels (VIP).

Current VIP technology generally comprises a single panel of insulation material formed typically of fumed silica, mineral fibre or other microporous material core, which may or may not contain infra red opacifiers, the core wrapped in a flexible, gas-tight envelope and a vacuum applied before sealing. The vacuum is essential to the panel's thermal insulating performance. Thermal conductivity properties of VIPs are typically of the order 0.005 W/mK. If the vacuum is lost the panel loses a large proportion of its effectiveness as a thermal insulator, with the thermal conductivity reverting to that of the core material, which is typically above 0.020 W/m.K The use of VIP technology in construction is not widespread but could enable improved insulation properties and allow a significant reduction in thickness of insulation materials required to meet ever increasing requirements for thermal efficiency of buildings. However, in considering the use of VIP for insulation in the floor, wall or roof of buildings there is a need to create robustness against various threats to piercing due to one or more of handing damage; cutting to size on site; fixing of panels to building substrate; and damage caused by drilling of holes for wiring, shelf fixing and the like.

It has been suggested to provide VIPs with compartments and sealed regions around the compartments. However, such sealed regions between compartments have poor thermal insulation properties and lead to a reduction in the overall thermal performance of the panel.

STATEMENTS OF INVENTION

According to the invention there is provided a prefabricated composite insulation board comprising a facer, a plurality of separate vacuum insulated panels adhesively bonded to the facer, at least some of the vacuum insulated panels being spaced-apart on the facer to define gaps therebetween, and a body of insulating foam material overlying the vacuum insulating panels and extending into the gaps between the vacuum insulation panels.

In one embodiment the facer has a pre-applied adhesive thereon.

The adhesive may be activated by one or more of heat, UV, chemical reaction or IR.

In one case the adhesive is heat activated.

The adhesive may comprise a plastic material such as a polyethylene material. The polyethylene (or more generally the plastic) may be a homopolymer or a copolymer with other suitable material(s).

In one case the adhesive comprises a film material.

In one embodiment the facer comprises a laminate and the adhesive comprises a layer of the facer to which the vacuum insulation panels are attached. This layer may be of a plastic material such as polyethylene.

In another embodiment the adhesive is covered by a removable protector.

In one aspect of the invention the gaps are at least partially defined by shaping the vacuum insulating panels. For example, the vacuum insulating panels may comprise rounded or angled corners.

In one embodiment the facer has indicia thereon to indicate the location of the gaps.

In one aspect of the invention the insulation board comprises a second facer overlying the vacuum insulating panels and the facer to which the vacuum insulating panels are bonded.

The first and second facers may be of the same material. The facer(s) may be of a flexible sheet material.

In one case the facer(s) comprises a metal or metallised material such as an aluminium foil, a stainless steel foil, or a metallised polymeric film.

The facer may comprise a paper, polymer film and/or a glass tissue composite.

In one embodiment the facer comprises a composite of two or more selected from metal foil, polymer film, paper and glass fibre tissue or scrim The invention also provides a method for manufacturing an insulating panel comprising the steps of:
  providing a first facer;
  adhesively bonding a plurality of vacuum insulation panels to the facer, at least some of the vacuum insulation panels being spaced-apart on the facer to define gaps therebetween;
  leading the facer with the vacuum insulation panels bonded thereto to a lay-down station;
  laying down liquid foam reactants over the vacuum insulation panels; and
  allowing the foam to expand to form an insulating body.

In one embodiment the method comprises the step of activating the adhesive prior to attachment of the vacuum insulation panel. The adhesive may be activated by heating the facer.

In one embodiment the method comprises the step of leading the facer over a heated surface such as across a heated bed and/or over a heated roller.

In one case the method comprises the step of controlling the temperature during and/or after application of a vacuum insulation panel. This may involve heating and/or cooling at least one bed. There may be several such beds which can be independently controlled.

In one aspect of the invention the method comprises the steps of:
  picking up a vacuum insulating panel; and
  placing the vacuum insulating panel on the facer.

In one embodiment the method comprises applying a second facer over the liquid foam reactants The invention also provides an insulating panel then manufactured by a method of the invention.

The invention provides an insulating panel comprising a carrier and a vacuum insulating panel attached thereto.

The vacuum insulated panel may be adhesively bonded to the carrier.

The carrier may comprise a panel facing. The facing may have a pre-applied adhesive thereon.

In one embodiment the insulating panel comprises a body of insulating material overlying the vacuum insulated panel.

In one case there are a plurality of separate vacuum insulated panels attached to the carrier. Spaces may be defined between at least some of the vacuum insulated panels. At least some of the spaces may be filled with an insulating material.

In one embodiment the spaces are at least partially defined by shaping the vacuum insulating panels. The vacuum insulating panels may comprise rounded or angled corners. In one case the facing has indicia thereon that indicate the location of the spacing.

In one embodiment the insulating panel comprises a second facing overlying the vacuum insulating panels and the carrier facing.

The carrier may comprise a flexible sheet material.

The first facing and/or the second facing may be of a flexible sheet material.

The first facing and/or the second facing may be of a metal or metallised material.

The first and/or second facings may be of aluminium foil.

The first and/or second facings may be of stainless steel foil.

In one case the first and/or second facings are of metallised polymeric film.

In one case the first and/or second facings are of the same material.

In one embodiment the insulating material is an insulating foam material.

The invention also provides a method for manufacturing an insulating panel comprising the steps of:
  leading a carrier to a vacuum insulation panel placing station; and
  attaching a vacuum insulation panel to the carrier.

In one embodiment the method comprises adhesively bonding the vacuum insulation panel to the carrier.

The method may comprise the step of providing a carrier having an adhesive pre-applied thereto.

The adhesive may be activated by heat, for example by leading the carrier across a heated bed or heated roller.

In one case the method comprises the steps of:
  picking up a vacuum insulating panel; and
  placing the vacuum insulation panel on the carrier.

The method may comprise the steps of:
  laying liquid foam reactants onto the vacuum insulating panel and carrier; and
  allowing the foam to expand to form an insulating body.

In one embodiment the method comprises applying a second facing over the liquid foam reactants.

The vacuum insulated panel may be inserted after application of a first laydown. The first laydown may comprise a bonding material which is compatible with the liquid foam reactants. The first laydown may comprise liquid foam reactants.

In one case a plurality of vacuum insulating panels are inserted.

In one embodiment the vacuum insulation panel contains an insulating medium which is self supporting.

The insulating medium may comprise a plurality of insulation pieces and a binder.

The insulating medium may be of an insulating foam material.

In one embodiment the insulating bodies are in powder form.

In one embodiment the insulating bodies are in solid form and may be of insulating foam material, fumed silica or aerogel.

BRIEF DESCRIPTION OF THE DRAWINGS

The invention will be more clearly understood from the following description of an embodiment thereof, given by way of example only, with reference to the accompanying drawings, in which.

DETAILED DESCRIPTION

Figure 1:
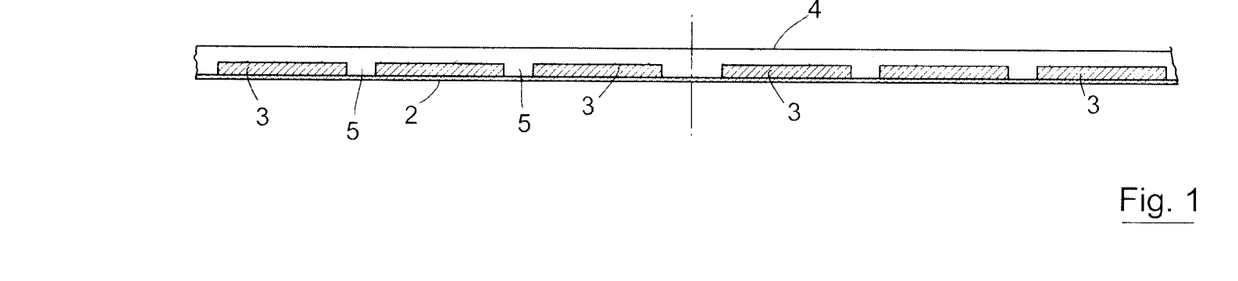
FIG. 1 is a longitudinal cross sectional view of a composite insulation board according to the invention.

Referring to the drawings and initially to FIG. 1 to thereof there is illustrated a prefabricated composite insulation board 1 according to the invention. The board 1 comprises a carrier facer 2 of a flexible sheet material and a plurality of vacuum insulation panels 3 attached thereto. A body of insulating foam 4 overlies the vacuum insulating panels 3 and the carrier facer 2.

The vacuum insulation panels 3 may be arranged in any desired configuration on the carrier facer 2. Some alternative set-ups are illustrated in FIGS. 2, 3 and 5 to 7. In some instances there are gaps 5 between adjacent individual vacuum insulation panels 3 and these gaps are filled with the foam 4. Alternatively, groups of VIP's 3 may be positioned close to one another and gaps 5 left at defined locations. These gaps 5 may be used to provide regions at which the panel may be cut to a desired length without cutting through any VIP's 3. External markings such as cut-lines 7 may be provided to indicate the location of these gaps 5.

Figure 2:
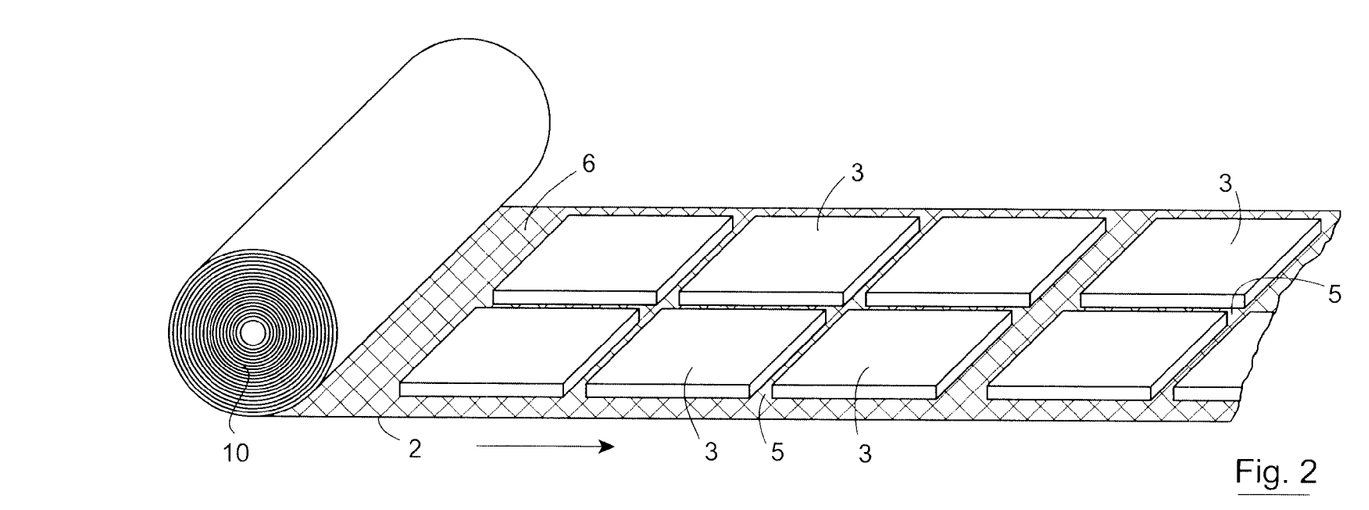
FIG. 2 is a perspective view illustrating steps in the manufacture of the board of FIG. 1 on a continuous manufacturing line.
Figure 10:
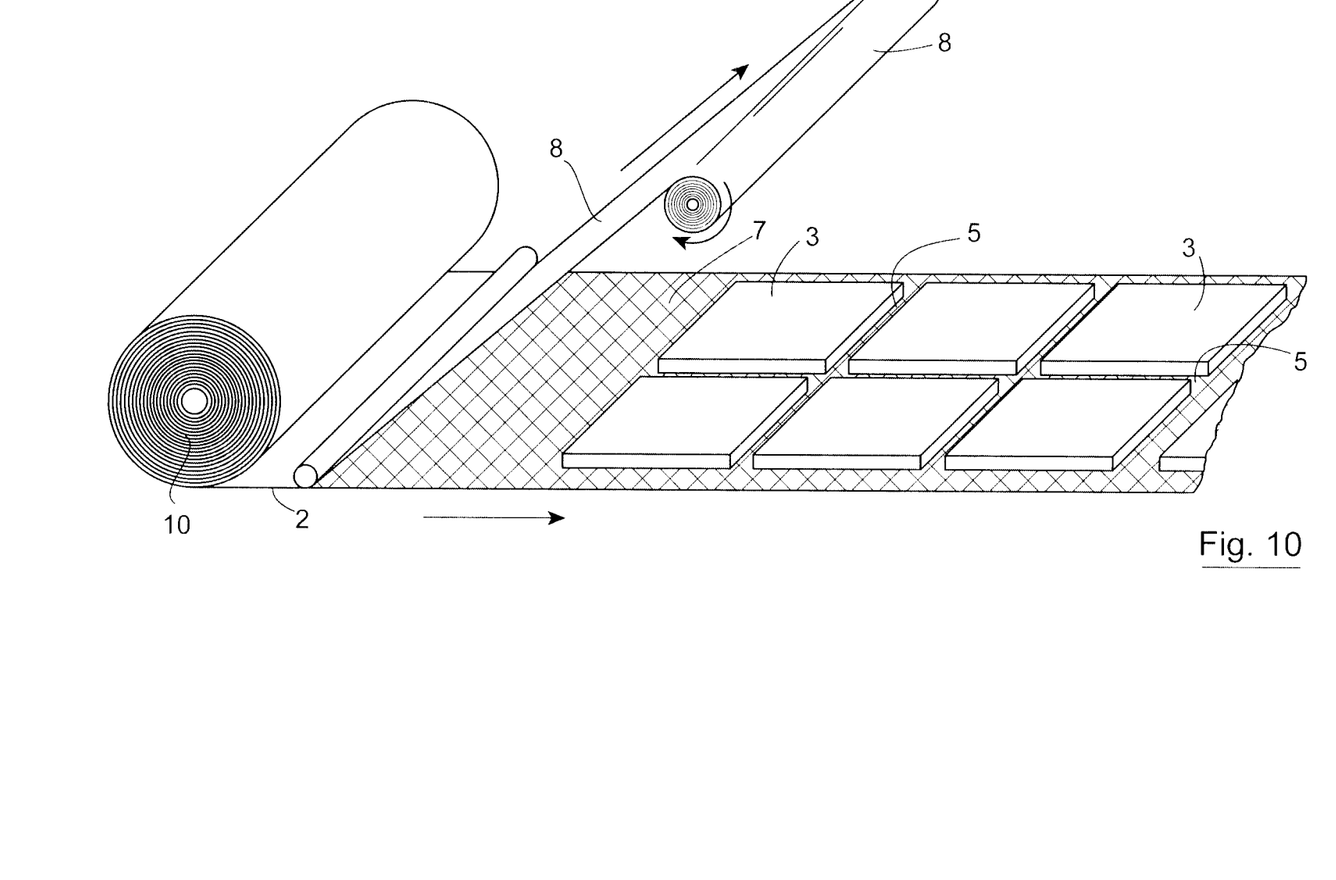
FIGS. 10 and 11 are perspective views of alternative steps in the manufacture of the composite insulation board of FIG. 1.

To manufacture a prefabricated composite insulation board 1 of the invention on a continuous manufacturing line a carrier facer sheet 2 with a pre-applied adhesive 6 is provided on a supply reel 10 as illustrated in FIG. 2. The adhesive 6 may be a low tack adhesive which facilitates unpeeling but retains VIP's 3 in place, in use. Alternatively, an adhesive layer 7 of a higher tack on the facer 2 may be covered by a removable film protector 8 (FIG. 10).

Figure 11:
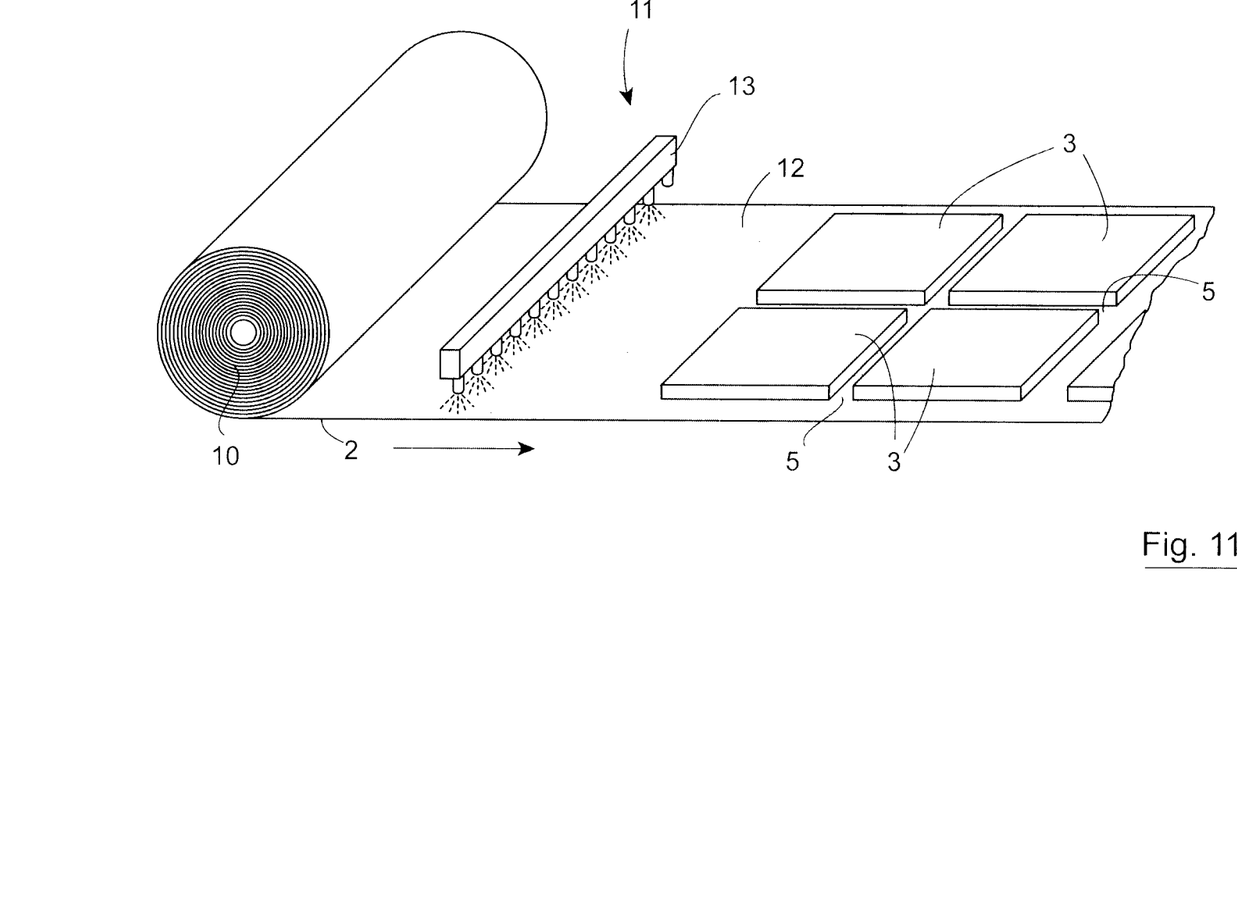

In one case (FIG. 11) a carrier facer sheet 2 is led continuously from a supply reel 10 to an applicator station 11 at which a layer of adhesive 12 may be applied to the uppermost face of the carrier 2, for example, using an applicator head.

Figure 3:
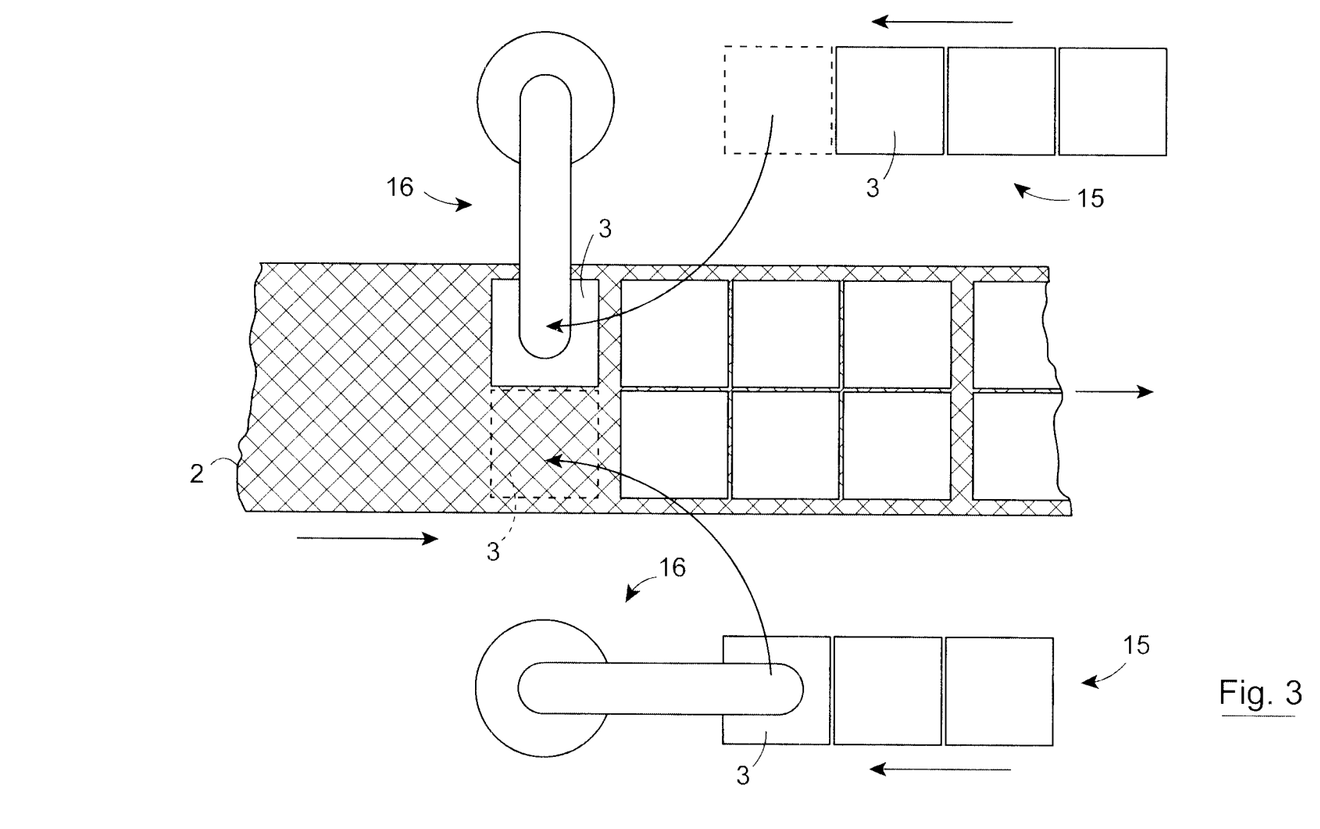
FIG. 3 is a plan view of a vacuum panel insertion station used in manufacturing the board.

The VIP's 3 may be applied over the adhesive bonding layer on the carrier facer 2 in any suitable manner. For example, as illustrated in FIG. 3 the VIP's may be provided in a supply cartridge or stack 15 and individual VIP's 3 or groups of VIP's 3 may be picked up and placed onto the adhesive on the carrier facer 2, using for example robots 16.

Figure 4:
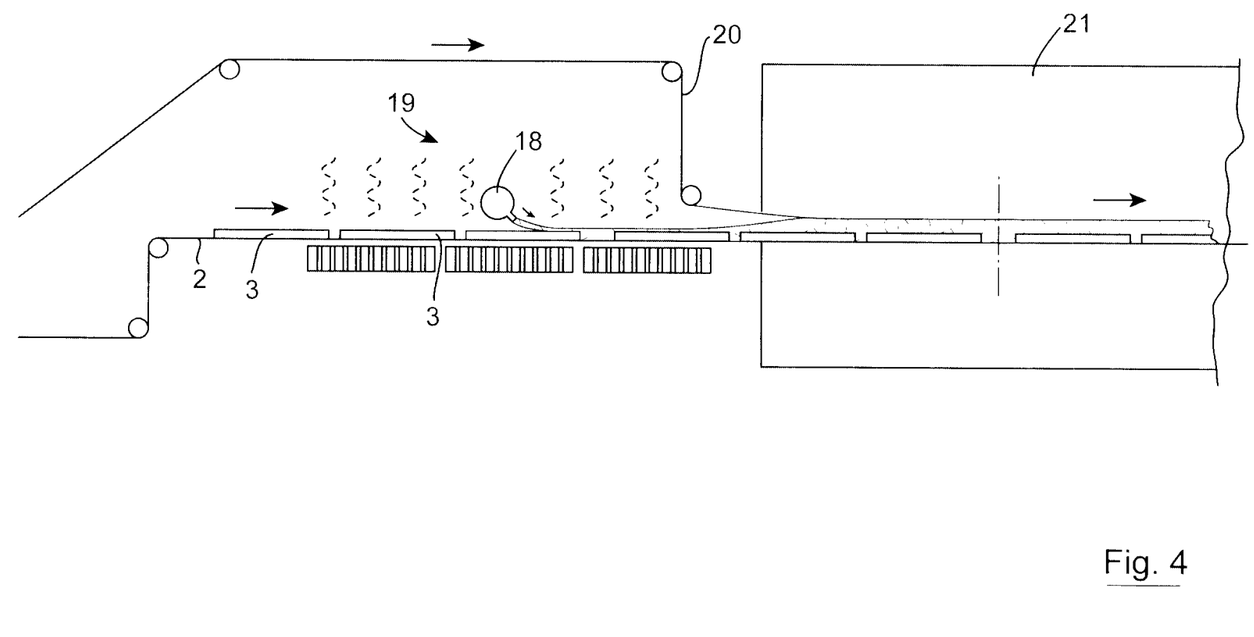
FIG. 4 is a side view illustrating further steps in the method of the invention.
Figure 5:
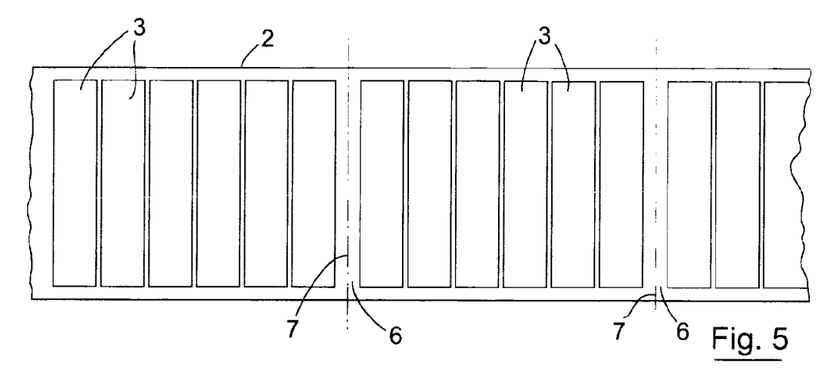
FIGS. 5 to 7 are top plan views of various composite insulation boards according to the invention.
Figure 6:
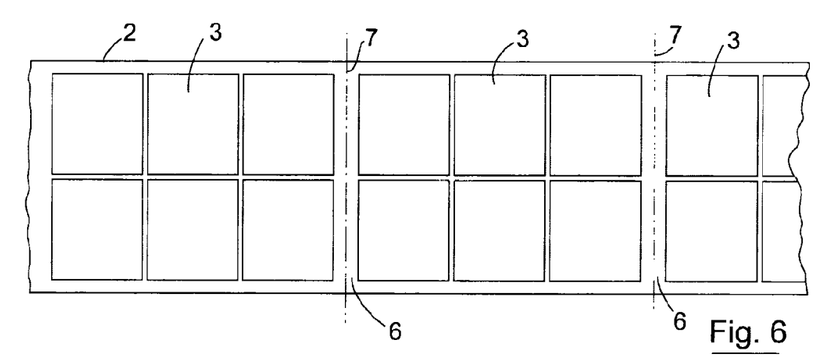
Figure 7:
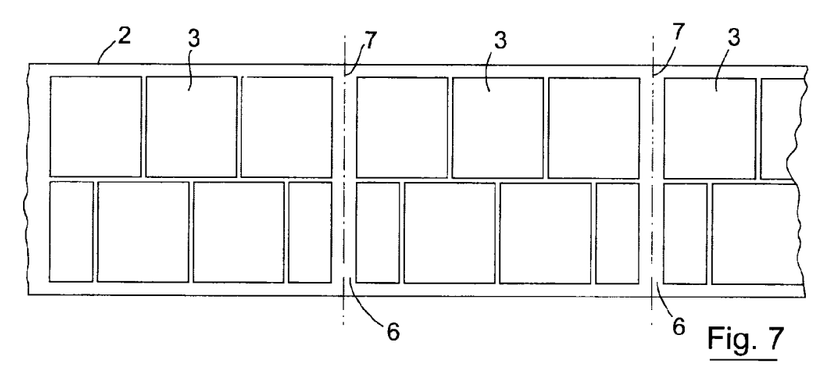

Referring particularly to FIG. 4, after application of the VIP's 3 liquid foam reactants are applied over the VIP's 3 and the carrier facer 2 using an applicator 18 at a foam lay-down station 19. An upper substrate or facer sheet 20 may be applied over the foam reactants and VIP's 3. The sandwich thus formed is then led through a laminator oven 21 in which the foam expands and a continuous length of rigid polymeric insulating foam board is formed. The board 15 may be led through an insulating tunnel and then cut to a desired length.

The facer sheets 2, 20 may be of the same or different materials. The facer sheets 2, 20 may for example comprise a foil or film material such as a metal or metalised material. One example of such material is an aluminium foil. Alternatively or additionally one or both of the facer sheets 2, 20 may comprise Kraft paper and or a glass tissue material.

The use of adhesive enables accurate, stable positioning of VIP's during the manufacturing process. Accurate positioning will allow minimal gaps between VIP's reducing edge losses and allowing better tolerance for cutting final panel sizes.

The foam covering over the VIP's provides protection for the VIP's against damage due to handling, installation and in use. The foam covering may also improve the life span of the VIP's by reducing moisture vapour and oxygen transfer.

Figure 12:
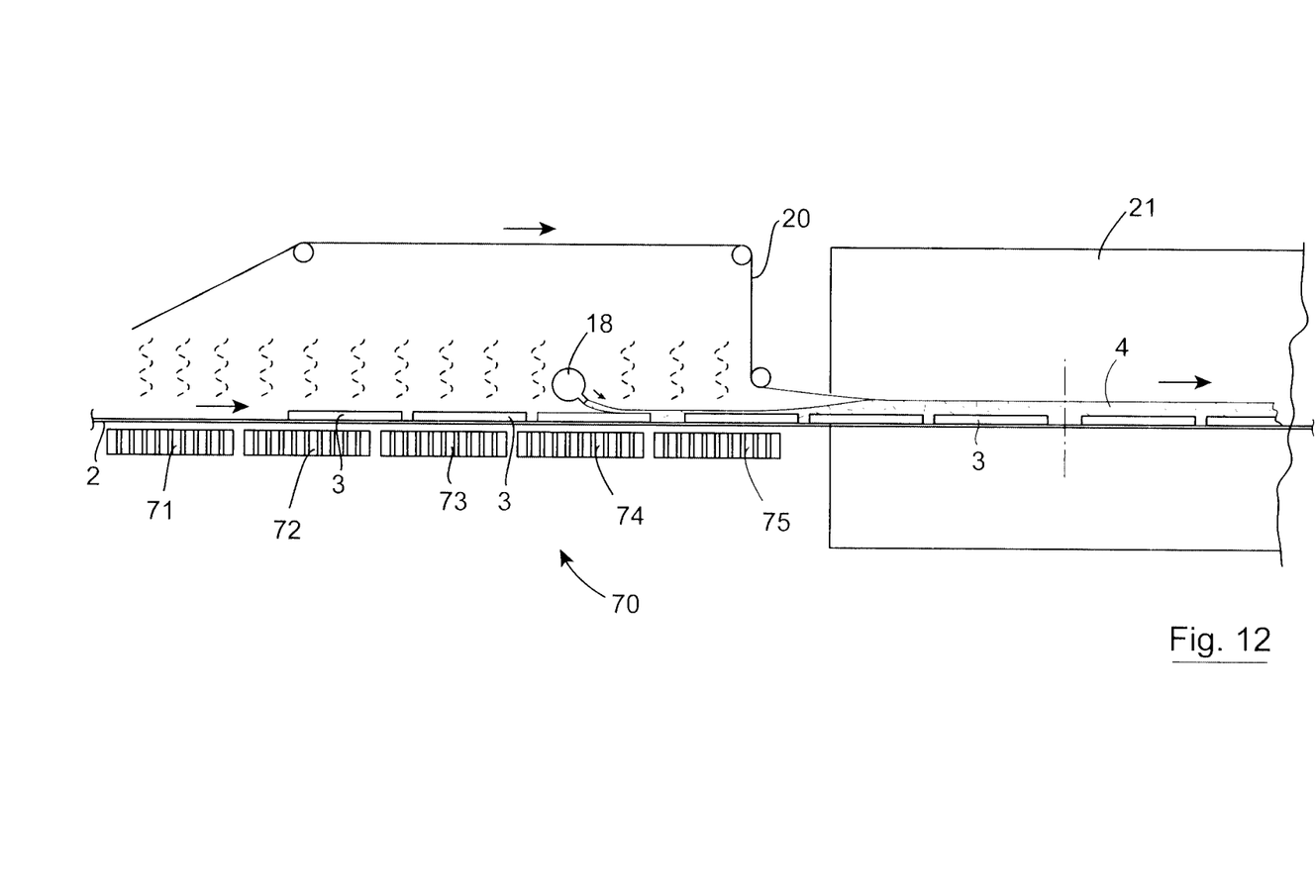
FIG. 12 is a side view illustrating steps in the manufacture of a board according to the invention.

Alternatively or additionally the adhesive may be activated by application of heat, UV, IR, or the like. One such system is illustrated in FIG. 12. In this case a carrier sheet 2 is provided with a pre-applied adhesive which is activated by heat supplied by a bed 70. The bed 70 may be in independently controlled sections 71, 72, 73, 74, 75 to vary the amount of heat applied and thereby closely control the activation of the adhesive prior to application of the vacuum insulation panels 3. After application of the vacuum insulation panels 3 liquid foam reactants are laid down from a lay-down head 18 and an upper substrate or facing sheet 20 is applied as described above. After initial heating and application of the vacuum insulation panels the beds 72, 73, 74 may be used to heat and/or cool to optimise the integration of the panels with the foam.

Figure 13:
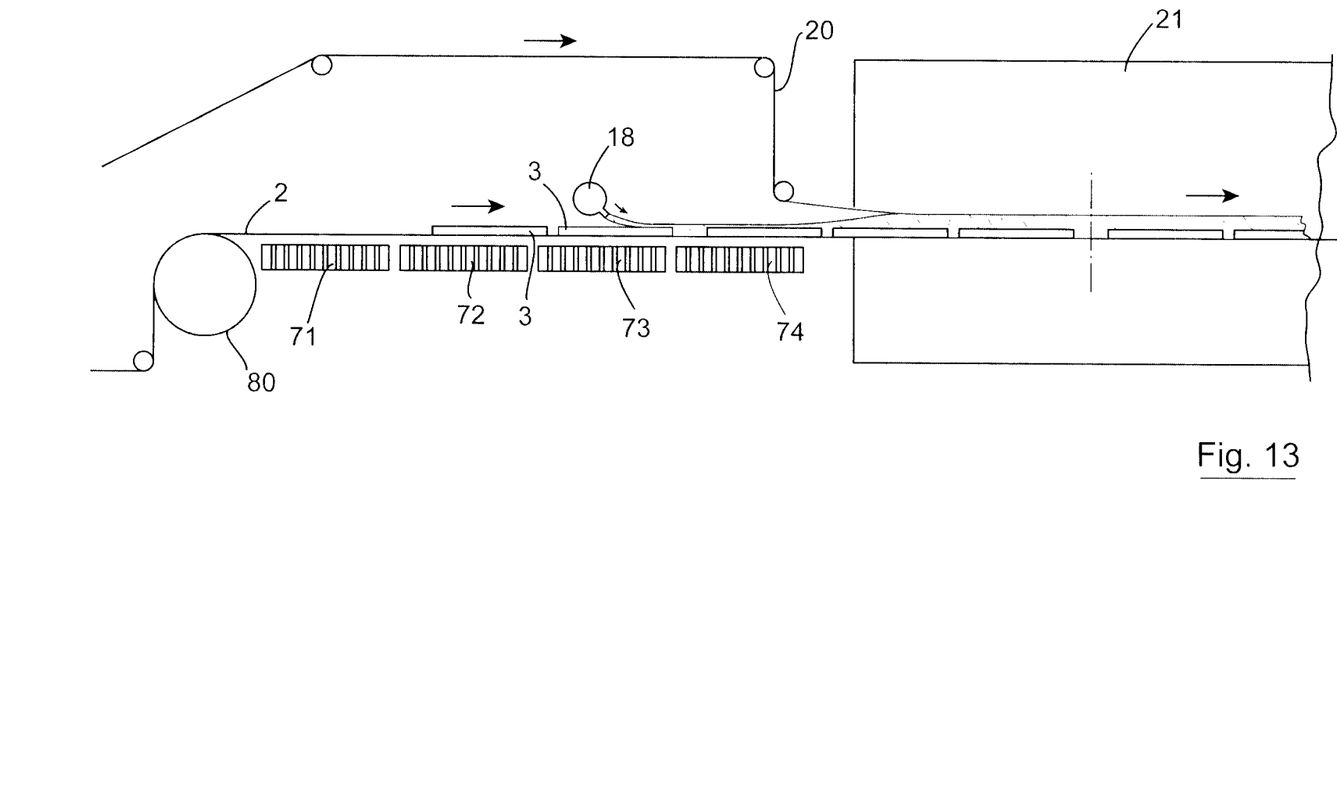
FIG. 13 is a side view illustrating steps in an alternative method for manufacturing a board according to the invention.

The adhesive may be provided by a film or layer of a suitable plastic material such as polyethylene which is heated to render it tacky prior to application of the vacuum insulation panels. To cause the plastic to become tacky quickly (possibly in a few seconds), as may be required in a continuous process, a high temperature such as 50 to 100 degrees centigrade above the melting point of the plastic may be applied via the heated bed or other application device, such as roller. In some cases the temperature may be increased gradually as the plastic passes over a heated bed. Alternatively or additionally as illustrated in FIG. 13, the plastic may be heated by passing it over a heated roller 80. This has the advantage of retaining the material taut so that heat can be applied efficiently over the width of the film layer. The heated roller 80 may in some cases be used in conjunction with beds 71, 72, 73, 74. The first bed 71 may be heated and the other beds 72, 73, 74 may be heated or cooled to optimise the integration of the vacuum insulation panels 3 with the foam.

A laminated facer 2 with an inner plastic layer may be used to provide for the adhesion of the vacuum insulated panels as described above. This provides significant advantages as it may be readily integrated into a continuous foam board factory scale production line.

The invention provides a process for manufacturing an insulation foam board in a continuous manner on a factory scale.

Figure 8:
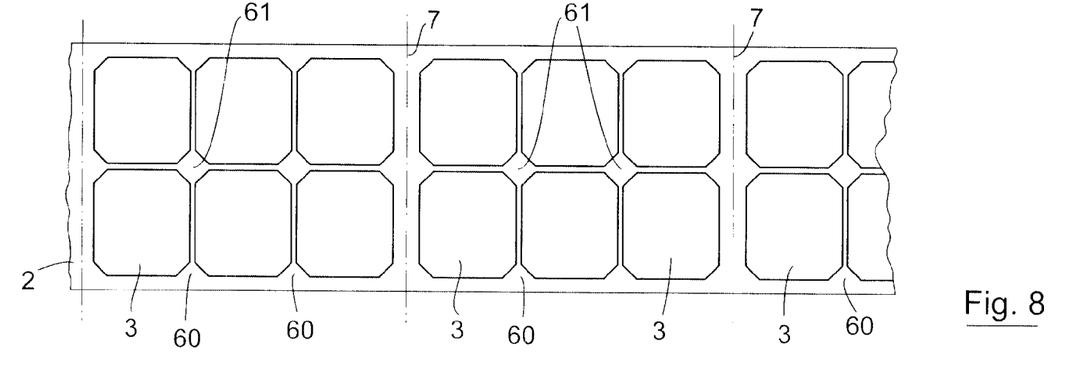
FIG. 8 is a plan view of a composite insulation board according to another embodiment of the invention.
Figure 9:
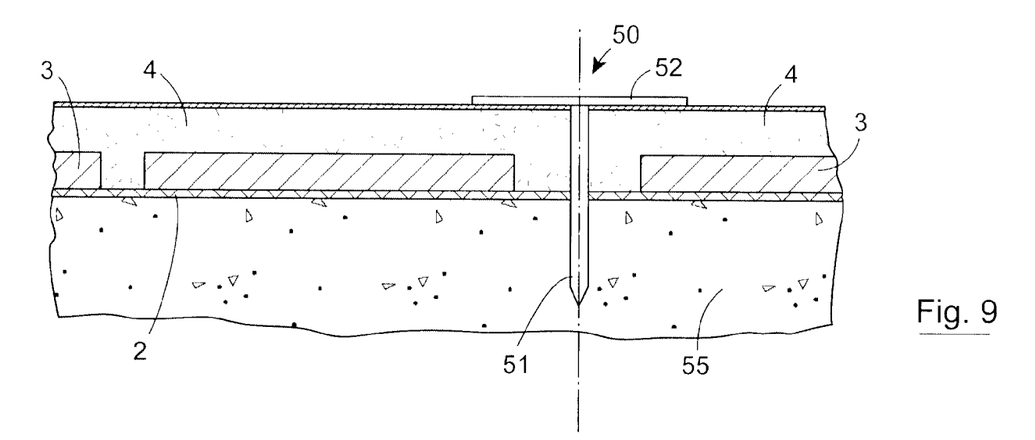
FIG. 9 is a cross sectional view illustrating the fixing of the board of FIG. 8 to a building substrate.

Referring to FIG. 8 there is illustrated another prefabricated composite insulation board according to the invention which is similar to the panels of FIGS. 1 and 5 to 7 and like parts are assigned the same reference numerals. In this case, the vacuum insulation panels 3 are shaped to define gaps for receiving fixings 50 such as of the type illustrated in FIG. 9 having a fixing shaft 51 (which may be threaded) and a head 52. For example, the vacuum insulated panels 3 may have rounded or angled corners to create sufficient space to receive a fixing between adjacent vacuum insulating panels 3. In FIG. 8 60 indicates an edge fixing region and 61 indicates a centre fixing region. Such regions may be identified on the facing(s) using suitable indicia, for example. FIG. 9 illustrates the fixing of the panel to an underlying substrate 55.

The prefabricated composite insulation boards of the invention may be used to form an insulating layer along walls, floors or roofs. They may be used during construction or in retrofitting to improve the insulation performance.

Modification and additions can be made to the embodiments of the invention described herein without departing from the scope of the invention. For example, while the embodiments described herein refer to particular features, the invention includes embodiments having different combinations of features. The invention also includes embodiments that do not include all of the specific features described.

The invention is not limited to the embodiments hereinbefore described, with reference to the accompanying drawings, which may be varied in construction and detail.

The invention claimed is:

1. A method for manufacturing an insulating panel comprising the steps of:
providing a first facer, wherein the facer comprises a laminate;
adhesively bonding a plurality of separate vacuum insulation panels to the facer, at least some of the vacuum insulation panels being spaced-apart on the facer to define gaps therebetween, wherein the adhesive is a layer of the facer to which the separate vacuum insulation panels are directly attached, and wherein the adhesive is activated prior to attachment of the vacuum insulation panels;
leading the facer with the vacuum insulation panels bonded thereto to a lay-down station;
laying down liquid foam reactants over the vacuum insulation panels; and
allowing the foam to expand to form an insulating body.

2. The method as claimed in claim 1 wherein the adhesive is activated by heating the facer.

3. The method as claimed in claim 2 comprising the step of leading the facer over a heated surface.

4. The method as claimed in claim 3 comprising leading the facer across a heated bed.

5. The method as claimed in claim 3 comprising leading the facer over a heated roller.

6. The method as claimed in claim 1 comprising the step of controlling the temperature during and/or after application of a vacuum insulation panel.

7. The method as claimed in claim 6 comprising heating and/or cooling at least one bed.

8. The method as claimed in claim 1 comprising the steps of: picking up one of the vacuum insulating panels; and placing the vacuum insulating panel on the facer.

9. The method as claimed in claim 1 comprising applying a second facer over the liquid foam reactants.

10. The method as claimed in claim 1, wherein the film material is a plastic material.

11. The method as claimed in claim 10, wherein the plastic material is polyethylene material.

12. The method as claimed in claim 11, wherein the polyethylene material is a copolymer.

\* \* \* \* \*

UNITED STATES PATENT AND TRADEMARK OFFICE
CERTIFICATE OF CORRECTION

| | | |
|---|---|---|
| PATENT NO. | : 9,157,229 B2 | Page 1 of 1 |
| APPLICATION NO. | : 13/704085 | |
| DATED | : October 13, 2015 | |
| INVENTOR(S) | : Adrian Pargeter et al. | |

It is certified that error appears in the above-identified patent and that said Letters Patent is hereby corrected as shown below:

In the specification

<u>Column 1</u>
Line 8       Insert the following heading --<u>Introduction</u>--.
Line 16     After "order", insert --of--.

<u>Column 2</u>
Line 45     Delete "then" and insert --when--.

Signed and Sealed this
Twenty-ninth Day of March, 2016

Michelle K. Lee
*Director of the United States Patent and Trademark Office*